(12) United States Patent
Wengerter et al.

(10) Patent No.: US 7,154,961 B2
(45) Date of Patent: Dec. 26, 2006

(54) CONSTELLATION REARRANGEMENT FOR ARQ TRANSMIT DIVERSITY SCHEMES

(75) Inventors: Christian Wengerter, Kleinheubach (DE); Alexander Golitschek Edler Von Elbwart, Darmstadt (DE); Eiko Seidel, Darmstadt (DE)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/501,906

(22) PCT Filed: Oct. 18, 2002

(86) PCT No.: PCT/EP02/11694

§ 371 (c)(1),
(2), (4) Date: Dec. 6, 2004

(87) PCT Pub. No.: WO2004/036818

PCT Pub. Date: Apr. 29, 2004

(65) Prior Publication Data

US 2005/0193307 A1    Sep. 1, 2005

(51) Int. Cl.
*H04B 7/02* (2006.01)
(52) U.S. Cl. ............... 375/267; 375/299; 375/298; 370/349; 714/748
(58) Field of Classification Search ............... 375/267, 375/299, 295, 298, 308, 261; 370/349, 465; 714/748, 761, 701, 786
See application file for complete search history.

(56) References Cited

U.S. PATENT DOCUMENTS

| | | | |
|---|---|---|---|
| 6,356,528 B1* | 3/2002 | Lundby et al. ............. | 370/209 |
| 6,476,734 B1* | 11/2002 | Jeong et al. ................. | 341/50 |
| 6,580,705 B1* | 6/2003 | Riazi et al. ................. | 370/347 |
| 6,769,085 B1* | 7/2004 | Von Elbwart et al. ...... | 714/748 |
| 6,892,341 B1* | 5/2005 | Golitschek et al. ......... | 714/748 |
| 2002/0036980 A1 | 3/2002 | Lundby et al. | |
| 2002/0114398 A1* | 8/2002 | Lin et al. ..................... | 375/253 |

(Continued)

FOREIGN PATENT DOCUMENTS

CN          1333605          1/2002

(Continued)

OTHER PUBLICATIONS

Wengerter, C et al., "Advanced Hybrid ARQ Technique Employing a Signal Constellation Rearrangement," 2002 IEEE 56th, IEEE Vehicular Technology Conference Proceedings, Vancouver, Canada, vol. 1 of 4 conf. 56, XP010608782, pp. 2002-2006. Sep. 24, 2002.

(Continued)

*Primary Examiner*—Temesghen Ghebretinsae
(74) *Attorney, Agent, or Firm*—Stevens, Davis, Miller & Mosher, LLP

(57) ABSTRACT

An ARQ (re-) transmission method of transmitting data in a wireless communication system wherein data packets are transmitted from a transmitter to a receiver, using a first transmission and a second transmission based on a repeat request. The method comprises the steps of modulating data at the transmitter using a first signal constellation pattern to obtain a first data symbol. The first data symbol is transmitted as the first transmission to the receiver using a first diversity branch. Further, the data is modulated at the transmitter using a second signal constellation pattern to obtain a second data symbol. Then, the second data symbol is transmitted as the second transmission to the receive over a second diversity branch. Finally, the received first and second data symbol data symbol are diversity combined at the receiver. The invention further relates to a transmitter and a receiver embodied to carry out the method of the invention.

11 Claims, 6 Drawing Sheets

U.S. PATENT DOCUMENTS

2003/0048857 A1* 3/2003 Onggosanusi et al. ...... 375/267

FOREIGN PATENT DOCUMENTS

EP      0735701     10/1996
EP      1172959     1/2002
WO      02067491    8/2002

OTHER PUBLICATIONS

"Enhanced HARQ Method with Signal Constellation Rearrangement," TSG-RAN Working Group 1 Meeting, No. 19, XP002229383, Feb. 27, 2001.

Aik, C. et al., "Bit-Interleaved Coded Modulation with Signal Space Diversity in Rayleigh Fading," Signals, Systems, and Computers, Conference Record of the Thirty-Third Asilomar Conference, Piscataway, NJ, IEEE, XP 010373787, pp. 1003-1007, Oct. 24, 1999.

Le Goff, S. et al., "Turbo-Codes and High Spectral Efficiency Modulation," Telecom Bretagne, France Telecom University, IEEE, XP 010608782, pp. 645-649, 1994.

Chinese Office Action dated Mar. 3, 2006 with English translation.

* cited by examiner

Mapping 1 (bit-mapping order: $i_1q_1i_2q_2$)

Mapping 2 (bit-mapping order: $i_1q_1i_2q_2$)

Mapping 4 (bit-mapping order: $i_1q_1i_2q_2$)

Mapping 3 (bit-mapping order: $i_1q_1i_2q_2$)

CONSTELLATION REARRANGEMENT FOR ARQ TRANSMIT DIVERSITY SCHEMES

FIELD OF THE INVENTION

The present invention relates generally to ARQ (re-) transmission techniques in wireless communication systems and in particular to a method, transceiver and receiver using transmit diversity schemes wherein data packets are transmitted using a first and a second transmission based on a repeat request, and the bit-to-symbol mapping is performed differently for different transmitted diversity branches. The invention is particularly applicable to systems with unreliable and time-varying channel conditions resulting in an improved performance avoiding transmission errors.

BACKGROUND OF THE RELATED ART

There exist several well known transmit diversity techniques wherein one or several redundancy versions relating to identical data are transmitted on several (at least two) diversity branches "by default" without explicitly requesting (by a feedback channel) further diversity branches (as done in an ARQ scheme by requesting retransmissions). For example the following schemes are considered as transmit diversity:

Site Diversity: The transmitted signal originates from different sites, e.g. different base stations in a cellular environment.

Antenna Diversity: The transmitted signal originates from different antennas, e.g. different antennas of a multi-antenna base station.

Polarization Diversity: The transmitted signal is mapped onto different polarizations.

Frequency Diversity: The transmitted signal is mapped e.g. on different carrier frequencies or on different frequency hopping sequences.

Time Diversity: The transmitted signal is e.g. mapped on different interleaving sequences.

Multicode Diversity: The transmitted signal is mapped on different codes in e.g. a CDMA (Code Division Multiple Access) system.

There are known several diversity combining techniques. The following three techniques are the most common ones:

Selection Combining: Selecting the diversity branch with the highest SNR for decoding, ignoring the remaining ones.

a Equal Gain Combining: Combining received diversity branches with ignoring the differences in received SNR.

Maximal Ratio Combining: Combining received diversity branches taking the received SNR of each diversity branch into account. The combining can be performed at bit-level (e.g. LLR) or at modulation symbol level.

Furthermore, a common technique for error detection/correction is based on Automatic Repeat reQuest (ARQ) schemes together with Forward Error Correction (FEC), called hybrid ARQ (HARQ). If an error is detected within a packet by the Cyclic Redundancy Check (CRC), the receiver requests the transmitter to send additional information (re-transmission) to improve the probability to correctly decode the erroneous packet.

In WO-02/067491 A1 a method for hybrid ARQ transmissions has been disclosed which averages the bit reliabilities over successively requested retransmissions by means of signal constellation rearrangement.

As shown therein, when employing higher order modulation formats (e.g. M-PSK, M-QAM with $\log_2(M)>2$), where more than 2 bits are mapped onto one modulation symbol, the bits have different reliabilities depending on the chosen mapping. This leads for most FEC (e.g. Turbo Codes) schemes to a degraded decoder performance compared to an input of more equally distributed bit reliabilities.

In conventional communication systems the modulation dependent variations in bit reliabilities are not taken into account and, hence, usually the variations remain after combining the diversity branches at the receiver.

SUMMARY OF INVENTION

The object of the invention is to provide an ARQ (re-) transmission method, a transmitter and a receiver which show an improved performance with regard to transmission errors. This object is solved by a method, transmitter and receiver as set forth in the independent claims.

The invention is based on the idea to improve the performance at the receiver by applying different signal constellation mappings to the available distinguishable transmit diversity branches and ARQ (re-) transmissions. The invention is applicable to modulation formats, where more than 2 bits are mapped onto one modulation symbol, since this implies a variation in reliabilities for the bits mapped onto the signal constellation. The variations depend on the employed mapping and on the actually transmitted content of the bits.

Depending on the employed modulation format and the actual number of bits mapped onto a single modulation symbol, for a given arbitrary number (N>1) of available diversity branches and required retransmissions the quality of the averaging process is different. Averaging in the sense of the present invention is understood as a process of reducing the differences in mean combined bit reliabilities among the different bits of a data symbol. Although it might be that only after using several diversity branches or paths a perfect averaging with no remaining differences is achieved, averaging means in the context of the document any process steps in the direction of reducing the mean combined bit reliability differences. Assuming on average an equal SNR for all available diversity branches and ARQ transmissions, for 16-QAM 4 mappings (4 diversity branches) would be needed to perfectly average out the reliabilities for all bits mapped on any symbol. However, not always the number of available transmit diversity branches and/or the number of ARQ transmissions is sufficient to perform a perfect averaging. Hence, the averaging should then be performed on a best effort basis as shown in the example below.

BRIEF DESCRIPTION OF THE DRAWINGS

The present invention will be more readily understood from the following detailed description of preferred embodiments with reference to the accompanying figures which show.

DETAILED DESCRIPTION or EMBODIMENT EXAMPLES

The method described here performs a combined averaging of bit reliabilities considering the transmit diversity branches. The following detailed description is shown for a square 16-QAM with Gray mapping. However, without loss of generality the shown example is extendable to other M-QAM and M-PSK (with $\log_2(M)>2$) formats. Moreover, the examples are shown for transmit diversity and HARQ schemes transmitting an identical bit-sequence on both branches and all HARQ transmissions (single redundancy version scheme). Then again, an extension to a transmit diversity and HARQ scheme transmitting only partly identical bits on the diversity branches and HARQ transmissions can be accomplished. An example for a system using multiple redundancy versions is described in copending EP 01127244, filed on Nov. 16, 2001. Assuming a Turbo encoder, the systematic bits can be averaged on a higher level as compared to the parity bits.

Although the below examples give details of an embodiment with the special case of hybrid ARQ (HARQ), it should be noted that the inclusion of an FEC code is not necessary for the present invention to show performance gains. However the highest performance gains can be achieved with the use of HARQ.

The following example describes a method with two diversity branches and HARQ.

$1^{st}$ Transmission:

Assuming a transmit diversity scheme with two generated diversity branches, which are distinguishable at the receiver (e.g. by different spreading or scrambling codes in a CDMA system) and a transmission of the same redundancy version, usually the received diversity branches are combined at the receiver before applying the FEC decoder. A common combining technique is the maximal ratio combining, which can be achieved by adding the calculated log-likelihood-ratios LLRs from each individual received diversity branch.

The log-likelihood-ratio LLR as a soft-metric for the reliability of a demodulated bit b from a received modulation symbol $r=x+jy$ is defined as follows:

$$LLR(b) = \ln\left[\frac{Pr\{b=1 \mid r\}}{Pr\{b=0 \mid r\}}\right] \quad (1)$$

Figure 1:
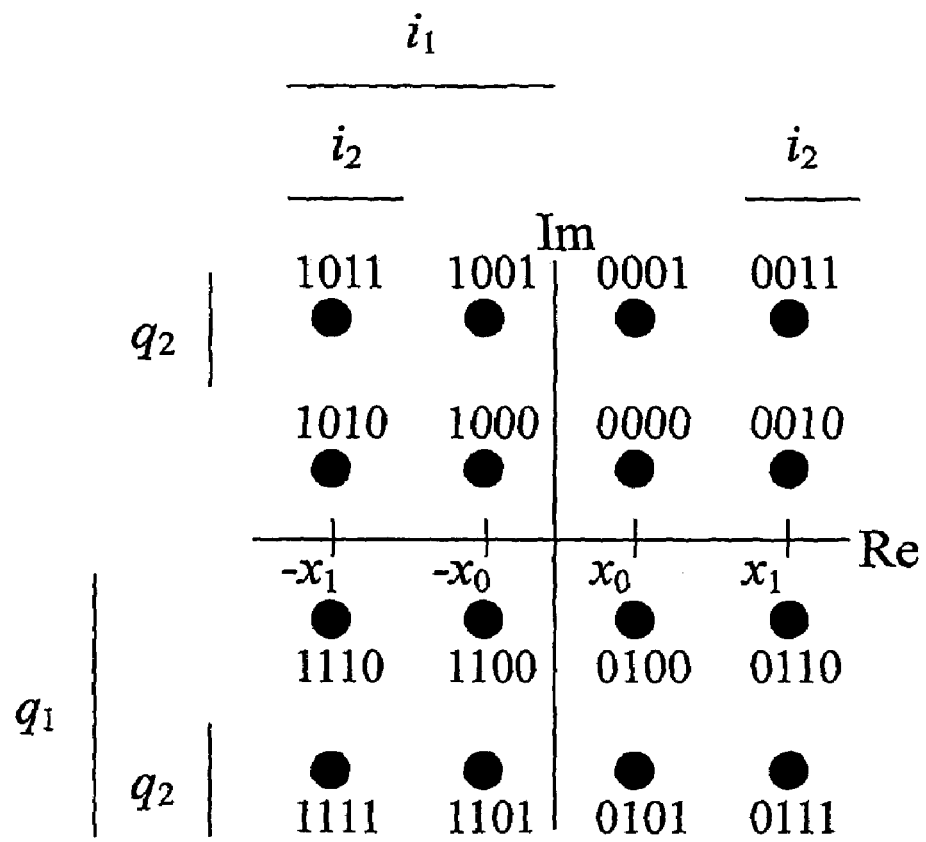
FIG. 1 an example for a 16-QAM signal constellation.

As can be seen from FIG. 1 (bars indicate rows/columns for which the respective bit equals 1), the mappings of the in-phase component bits and the quadrature component bits on the signal constellation are orthogonal (for M-PSK the LLR calculation cannot be simplified by separating into complex components, however the general procedure of bit-reliability averaging is similar). Therefore, it is sufficient to focus on the in-phase component bits $i_1$ and $i_2$. The same conclusions apply then for $q_1$ and $q_2$.

Assuming that Mapping 1 from FIG. 1 is applied for the bit-to-symbol mapping for the $1^{st}$ diversity branch, the log-likelihood-ratio LLR of the most significant bit (MSB) $i_1$ and the least significant bit (LSB) $i_2$ yields the following equations for a Gaussian channel:

$$LLR(i_1) = \ln\left[\frac{e^{-K(x+x_0)^2} + e^{-K(x+x_1)^2}}{e^{-K(x-x_0)^2} + e^{-K(x-x_1)^2}}\right] \quad (2)$$

$$LLR(i_2) = \ln\left[\frac{e^{-K(x-x_1)^2} + e^{-K(x+x_1)^2}}{e^{-K(x-x_0)^2} + e^{-K(x+x_0)^2}}\right] \quad (3)$$

where x denotes the in-phase component of the normalized received modulation symbol r and K is a factor proportional to the signal-to-noise ratio. Under the assumption of a uniform signal constellation ($x_1=3x_0$) equations (2) and (3) can be fairly good approximated approximated, as shown in S. Le Goff, A. Glavieux, C. Berrou, "Turbo-Codes and High Spectral Efficiency Modulation," IEEE SUPERCOMM/ICC '94, Vol. 2, pp. 645–649, 1994, and Ch. Wengerter, A. Golitschek Edler von Elbwart, E. Seidel, G. Velev, M. P. Schmitt, "Advanced Hybrid ARQ Technique Employing a Signal Constellation Rearrangement," IEEE Proceedings of VTC 2002 Fall, Vancouver, Canada, September 2002, by $$LLR(i_1) \approx -4Kx_0 x \quad (4)$$

$$LLR(i_2) \approx -4Kx_0(2x_0 - |x|) \quad (5)$$

The mean LLR for $i_1$ and $i_2$ for a given transmitted modulation symbol yields the values given in Table 1 (substituting $4Kx_0^2$ by $\Lambda$). Mean in this sense, refers to that the mean received value for a given transmitted constellation point, exactly matches this transmitted constellation point. Individual samples of course experience noise according to the parameter K. However, for a Gaussian channel the mean value of the noise process is zero. In case of transmitted modulation symbols $0q_11q_2$ and $1q_11q_2$, where $q_1$ and $q_2$ are arbitrary, the magnitude of the mean LLR ($i_1$) is higher than of the mean LLR ($i_2$). This means that the LLR for the MSB $i_1$ depends on the content of the LSB $i_2$; e.g. in FIG. 1 $i_1$ has a higher mean reliability in case the logical value for $i_2$ equals 1 (leftmost and rightmost columns). Hence, assuming a uniform distribution of transmitted modulation symbols, on average 50% of the MSBs $i_1$ have about three times the magnitude in LLR of $i_2$.

TABLE 1

Mean LLRs for bits mapped on the in-phase component of the signal constellation for Mapping 1 in FIG. 1 according to equations (4) and (5).

| Symbol $(i_1q_1i_2q_2)$ | Mean value of x | Mean LLR ($i_1$) | Mean LLR ($i_2$) |
|---|---|---|---|
| $0q_10q_2$ | $x_0$ | $-4Kx_0^2 = -\Lambda$ | $-4kx_0^2 = -\Lambda$ |
| $0q_11q_2$ | $x_1$ | $-2Kx_0^2 = -3\Lambda$ | $4Kx_0^2 = \Lambda$ |
| $1q_10q_2$ | $-x_0$ | $4Kx_0^2 = \Lambda$ | $-4Kx_0^2 = -\Lambda$ |
| $1q_11q_2$ | $-x_1$ | $12Kx_0^2 = \Lambda$ | $4Kx_0^2 = \Lambda$ |

If now adding a $2^{nd}$ transmit diversity branch transmitting e.g. an identical bit sequence prior art schemes would employ an identical mapping to the $1^{st}$ diversity branch. Here, it is proposed to employ a $2^{nd}$ signal constellation mapping (Mapping 2) according to FIG. 2, which yields the mean LLRs given in Table 2.

TABLE 2

Figure 2:
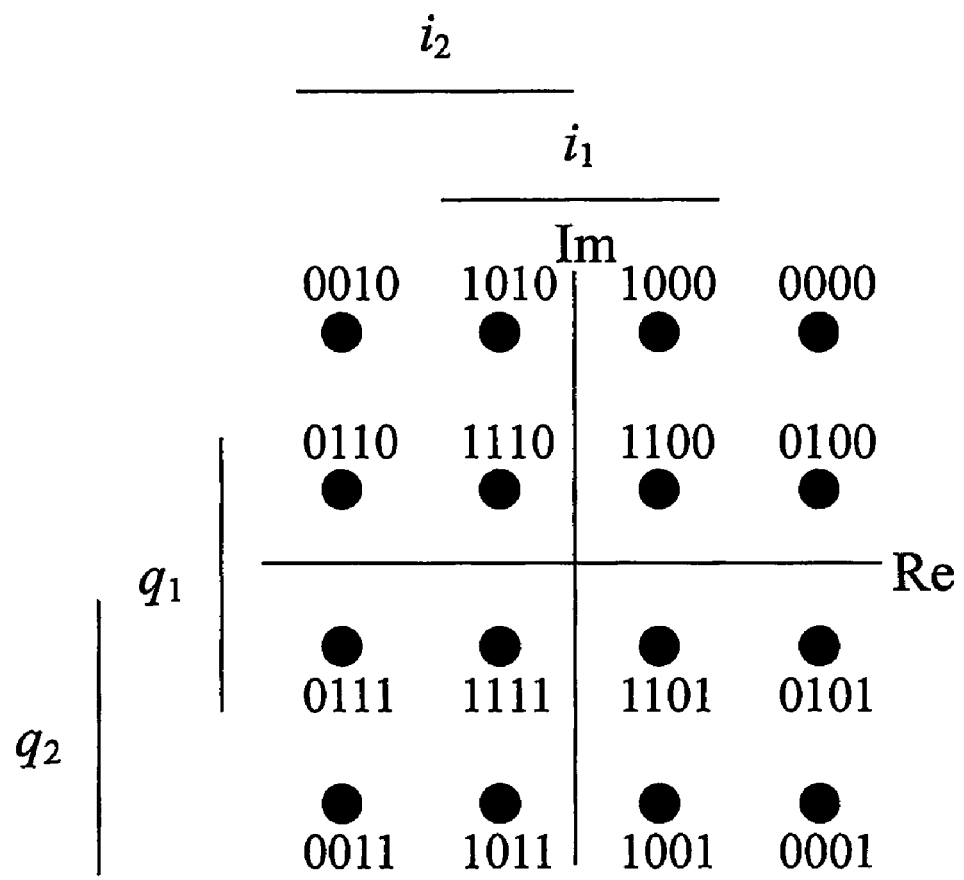
FIG. 2 an example for a different mapping of a 16-QAM signal constellation.

Mean LLRs for bits mapped on the in-phase component of the signal constellation for Mapping 2 in FIG. 2.

| Symbol $(i_1q_1i_2q_2)$ | Mean value of x | Mean LLR $(i_1)$ | Mean LLR $(i_2)$ |
|---|---|---|---|
| $0q_10q_2$ | $x_0$ | $-\Lambda$ | $-3\Lambda$ |
| $0q_11q_2$ | $x_1$ | $-\Lambda$ | $3\Lambda$ |
| $1q_10q_2$ | $-x_0$ | $\Lambda$ | $-\Lambda$ |
| $1q_11q_2$ | $-x_1$ | $\Lambda$ | $\Lambda$ |

Comparing now the soft-combined LLRs of the received diversity branches applying the constellation rearrangement (Mapping 1+2) and applying the identical mappings (Mapping 1+1, prior art), it can be observed from Table 3 that the combined mean LLR values with applying the constellation rearrangement have a more uniform distribution (Magnitudes: 4×4Λ and 4×2Λ instead of 2×6Λ and 6×2Λ). For most FEC decoders (e.g. Turbo Codes and Convolutional Codes) this leads to a better decoding performance. Investigations have revealed that in particular Turbo encoding/decoding systems exhibit a superior performance. It should be noted, that the chosen mappings are non exhaustive and more combinations of mappings fulfilling the same requirements can be found.

TABLE 3

Mean LLRs (per branch) and combined mean LLRs for bits mapped on the in-phase component of the signal constellation for the diversity branches when employing Mapping 1 and 2 and when employing 2 times Mapping 1.

| Transmit Diversity Branch | Symbol $(i_1q_1i_2q_2)$ | Constellation Rearrangement (Mapping 1 + 2) | | Prior Art No Rearrangement (Mapping 1 + 1) | |
|---|---|---|---|---|---|
| | | Mean LLR $(i_1)$ | Mean LLR $(i_2)$ | Mean LLR $(i_1)$ | Mean LLR $(i_2)$ |
| 1 | $0q_10q_2$ | $-\Lambda$ | $-\Lambda$ | $-\Lambda$ | $-\Lambda$ |
| | $0q_11q_2$ | $-3\Lambda$ | $\Lambda$ | $-3\Lambda$ | $\Lambda$ |
| | $1q_10q_2$ | $\Lambda$ | $-\Lambda$ | $\Lambda$ | $-\Lambda$ |
| | $1q_11q_2$ | $3\Lambda$ | $\Lambda$ | $3\Lambda$ | $\Lambda$ |
| 2 | $0q_10q_2$ | $-\Lambda$ | $-3\Lambda$ | $-\Lambda$ | $-\Lambda$ |
| | $0q_11q_2$ | $-\Lambda$ | $3\Lambda$ | $-3\Lambda$ | $\Lambda$ |
| | $1q_10q_2$ | $\Lambda$ | $-\Lambda$ | $\Lambda$ | $-\Lambda$ |
| | $1q_11q_2$ | $\Lambda$ | $\Lambda$ | $3\Lambda$ | $\Lambda$ |
| Combined 1 + 2 | $0q_10q_2$ | $-2\Lambda$ | $-4\Lambda$ | $-2\Lambda$ | $-2\Lambda$ |
| | $0q_11q_2$ | $-4\Lambda$ | $-4\Lambda$ | $-6\Lambda$ | $2\Lambda$ |
| | $1q_10q_2$ | $2\Lambda$ | $-2\Lambda$ | $2\Lambda$ | $-2\Lambda$ |
| | $1q_11q_2$ | $4\Lambda$ | $2\Lambda$ | $6\Lambda$ | $2\Lambda$ |

$2^{nd}$ and Further Transmissions:

In case the $1^{st}$ transmission has not been successfully decoded the receiver requests a retransmission ($2^{nd}$ transmission). Assuming for $2^{nd}$ transmission also 2 transmit diversity branches are available, the 2 additional mappings (mapping 3 and mapping 4 in FIG. 3) are employed to further improve the averaging of the bit reliabilities as shown in Table 4. In this example (assuming an equal SNR for all received signals) the averaging is performed perfectly after receiving 2 transmit diversity branches times 2 transmissions (possibility to employ 4 different mappings—sufficient for 16-QAM). Table 4 compares the LLRs with and without applying the proposed Constellation Rearrangement. Having a closer look at the combined LLRs, it can be seen that with application of the Constellation Rearrangement the magnitude for all bit reliabilities results in 6Λ.

It should be noted again, that the chosen mappings are non exhaustive and more combinations of mappings fulfilling the same requirements can be found.

TABLE 4

Mean LLRs (per branch) and combined mean LLRs for bits mapped on the in-phase component of the signal constellation for the diversity branches and (re-) transmissions when employing Mappings 1 to 4 and when employing 4 times Mapping 1.

| Transmit Diversity Branch | Transmission Number | Symbol $(i_1q_1i_2q_2)$ | Constellation Rearrangement (Mapping 1 + 2 + 3 + 4) | | Prior Art No Rearrangement (Mapping 1 + 1 + 1 + 1) | |
|---|---|---|---|---|---|---|
| | | | Mean LLR $(i_1)$ | Mean LLR $(i_2)$ | Mean LLR $(i_1)$ | Mean LLR $(i_2)$ |
| 1 | 1 | $0q_10q_2$ | $-\Lambda$ | $-\Lambda$ | $-\Lambda$ | $-\Lambda$ |
| | | $0q_11q_2$ | $-3\Lambda$ | $\Lambda$ | $-3\Lambda$ | $\Lambda$ |
| | | $1q_10q_2$ | $\Lambda$ | $-\Lambda$ | $\Lambda$ | $-\Lambda$ |
| | | $1q_11q_2$ | $3\Lambda$ | $\Lambda$ | $3\Lambda$ | $\Lambda$ |
| 2 | 1 | $0q_10q_2$ | $-\Lambda$ | $-3\Lambda$ | $-\Lambda$ | $-\Lambda$ |
| | | $0q_11q_2$ | $-\Lambda$ | $3\Lambda$ | $-3\Lambda$ | $\Lambda$ |
| | | $1q_10q_2$ | $\Lambda$ | $-\Lambda$ | $\Lambda$ | $-\Lambda$ |
| | | $1q_11q_2$ | $\Lambda$ | $\Lambda$ | $3\Lambda$ | $\Lambda$ |
| 3 | 2 | $0q_10q_2$ | $-\Lambda$ | $-\Lambda$ | $-\Lambda$ | $-\Lambda$ |
| | | $0q_11q_2$ | $-\Lambda$ | $\Lambda$ | $-3\Lambda$ | $\Lambda$ |
| | | $1q_10q_2$ | $\Lambda$ | $-3\Lambda$ | $\Lambda$ | $-\Lambda$ |
| | | $1q_11q_2$ | $\Lambda$ | $3\Lambda$ | $3\Lambda$ | $\Lambda$ |

TABLE 4-continued

Mean LLRs (per branch) and combined mean LLRs for bits mapped on the in-phase component of the signal constellation for the diversity branches and (re-) transmissions when employing Mappings 1 to 4 and when employing 4 times Mapping 1.

| Transmit Diversity Branch | Transmission Number | Symbol ($i_1 q_1 i_2 q_2$) | Constellation Rearrangement (Mapping 1 + 2 + 3 + 4) | | Prior Art No Rearrangement (Mapping 1 + 1 + 1 + 1) | |
|---|---|---|---|---|---|---|
| | | | Mean LLR ($i_1$) | Mean LLR ($i_2$) | Mean LLR ($i_1$) | Mean LLR ($i_2$) |
| 4 | 2 | $0q_1 0q_2$ | $-3\Lambda$ | $-\Lambda$ | $-\Lambda$ | $-\Lambda$ |
| | | $0q_1 1q_2$ | $-\Lambda$ | $\Lambda$ | $-3\Lambda$ | $\Lambda$ |
| | | $1q_1 0q_2$ | $3\Lambda$ | $-\Lambda$ | $\Lambda$ | $-\Lambda$ |
| | | $1q_1 1q_2$ | $\Lambda$ | $\Lambda$ | $3\Lambda$ | $\Lambda$ |
| Combined 1 + 2 + 3 + 4 | | $0q_1 0q_2$ | $-6\Lambda$ | $-6\Lambda$ | $-4\Lambda$ | $-4\Lambda$ |
| | | $0q_1 1q_2$ | $-6\Lambda$ | $6\Lambda$ | $-12\Lambda$ | $4\Lambda$ |
| | | $1q_1 0q_2$ | $6\Lambda$ | $-6\Lambda$ | $4\Lambda$ | $-4\Lambda$ |
| | | $1q_1 1q_2$ | $6\Lambda$ | $6\Lambda$ | $12\Lambda$ | $4\Lambda$ |

Figures 3A, 3B:
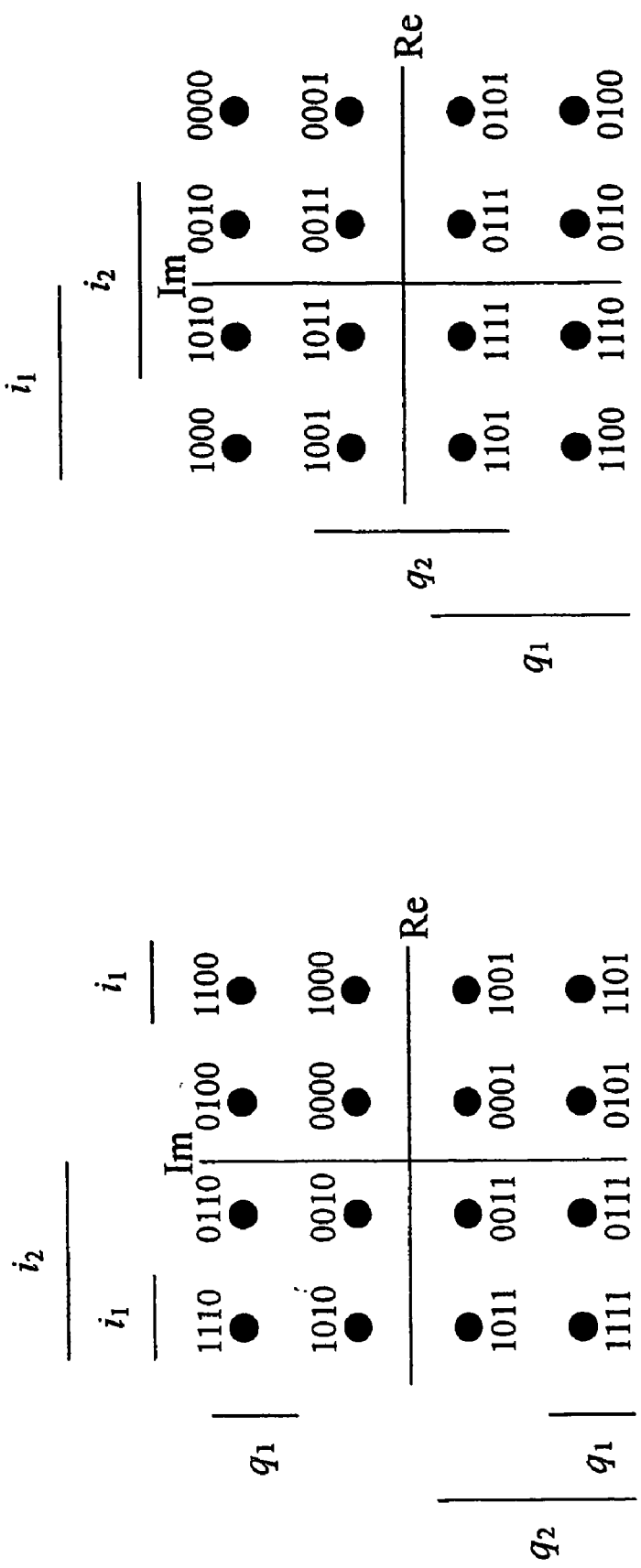
FIG. 3 two further examples of 16-QAM signal constellations.
Figure 6:
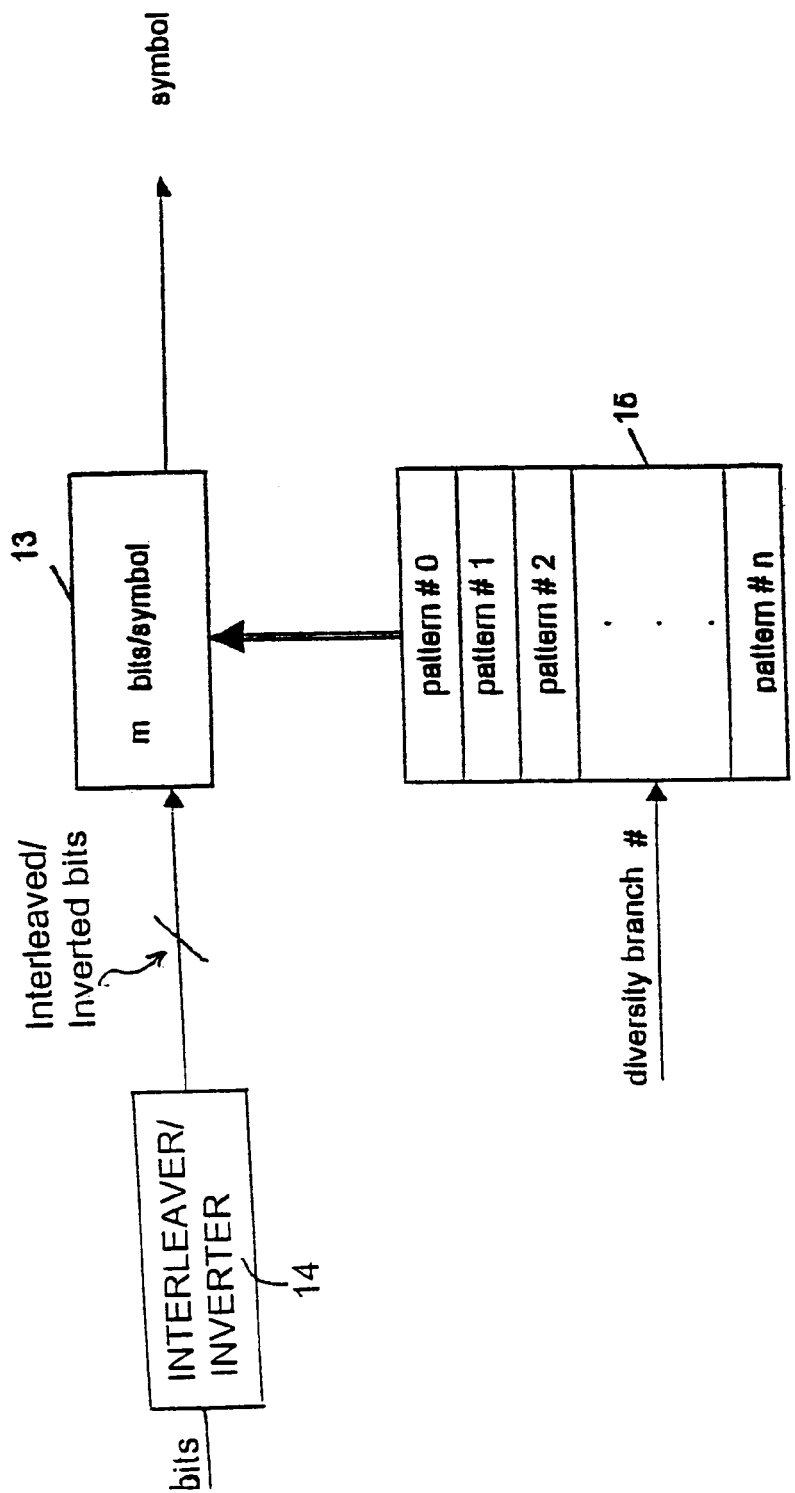
FIG. 6 show the communication system according to the present invetion with an interleaver/inverter section.

If the constellation rearrangement is performed by applying different mapping schemes, one would end up in employing a number of different mappings as given in FIG. 1, FIG. 2 and FIG. 3. If the identical mapper (e.g. FIG. 1) should be kept for all transmit diversity branches, e.g. mapping 2 can be obtained from mapping 1 by the following operations:

exchange positions of original bits $i_1$ and $i_2$
exchange positions of original bits $q_1$ and $q_2$
logical bit inversion of original bits $i_1$ and $q_1$ Alternatively, those bits that end in positions 1 and 2 can also be inverted (resulting in a different mapping with an identical bit-reliability characteristics). Accordingly, mapping 2 can be obtained from mapping 1, using an interleaver/inverter section 14 (see FIG. 6) which performs interleaving and/or inverting of the bits.

TABLE 5

Alternative implementation of the Constellation Rearrangement by interleaving (intra-symbol interleaving) and logical inversion of bits mapped onto the modulation symbols.

| Mapping No. | Interleaver and Inverter functionality |
|---|---|
| 1 | $i_1 q_1 i_2 q_2$ |
| 2 | $i_2 q_2 \bar{i}_1 \bar{q}_1$ or $i_2 q_2 i_1 \bar{q}_1$ |
| 3 | $\bar{i}_2 \bar{q}_2 i_1 q_1$ or $i_2 q_2 i_1 q_1$ |
| 4 | $i_1 q_1 \bar{i}_2 \bar{q}_2$ or $\bar{i}_1 q_1 i_2 q_2$ |

Generally at least 2 different mappings should be employed for N>1 diversity branches, where the order and the selection of the mappings is irrelevant, as long as the bit-reliability averaging process, meaning the reduction in differences in bit reliabilities) is maintained.

Preferred realizations in terms of number of employed mappings

M-QAM

Employing $\log_2(M)$ different mappings
Employing $\log_2(M)/2$ different mappings

M-PSK

Employing $\log_2(M)$ different mappings
Employing $\log_2(M)/2$ different mappings
Employing $2\log_2(M)$ different mappings The applied signal constellation mappings for modulation at the transmitter and demodulation at the receiver need to match for each individual transmit diversity branch. This can be achieved by appropriate signalling of parameters indicating the proper mapping or combination of mappings to be applied for the diversity branches and HARQ transmissions. Alternatively the definition of the mappings to be applied for transmit diversity branches and HARQ transmissions may be system predefined.

Figure 4:
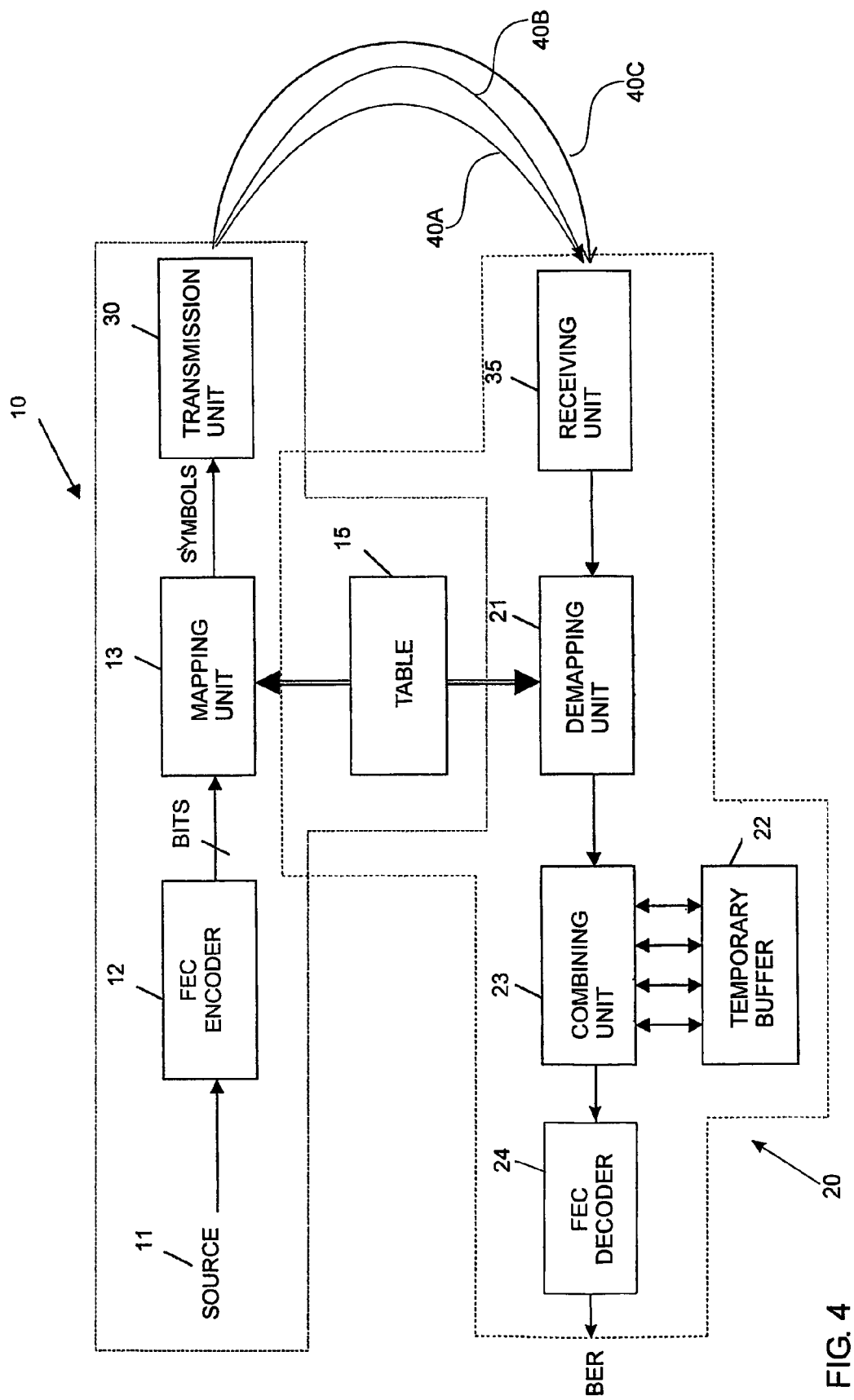
FIG. 4 an exemplary embodiment of a communication system according to the present invention.

FIG. 4 shows an exemplary embodiment of a communication system according to the present invention. More specifically, the communication system comprises a transmitter 10 and a receiver 20 which communicate through a communication channel consisting of a plurality of diversity branches 40A, 40B and 40C. Although three diversity branches are illustrated in the figure, it becomes clear to a person skilled in the art that an arbitrary number of branches may be chosen. From a data source 11, data packets are supplied to a FEC encoder 12, preferably a FEC Turbo encoder, where redundancy bits are added to correct errors. The bits output from the FEC encoder are subsequently supplied to a mapping unit 13 acting as a modulator to output symbols formed according to the applied modulation scheme stored as a constellation pattern in a table 15. Subsequently the data symbols are applied to a transmission unit 30 for transmission over the branches 40A–C. The receiver 20 receives the data packets by the receiving unit 35. The bits are then input into a demapping unit 21 which acts as a demodulator using the same signal constellation pattern stored in the table 15 which was used during the modulation of these bits.

The demodulated data packets received over one diversity branch are stored in a temporary buffer 22 for subsequent combining in a combining unit 23 with the data packets received over at least one other diversity branch.

A retransmission is launched by an automatic repeat request issued by an error detector (not shown) with the result that an identical data packet is transmitted from the transmitter 10. In the combining unit 23, the previously received erroneous data packets are soft-combined with the retransmitted data packets. Then a decoder decodes the bits and output a measure for the transmission quality, e.g. the bit-error-rate BER.

Figure 5:
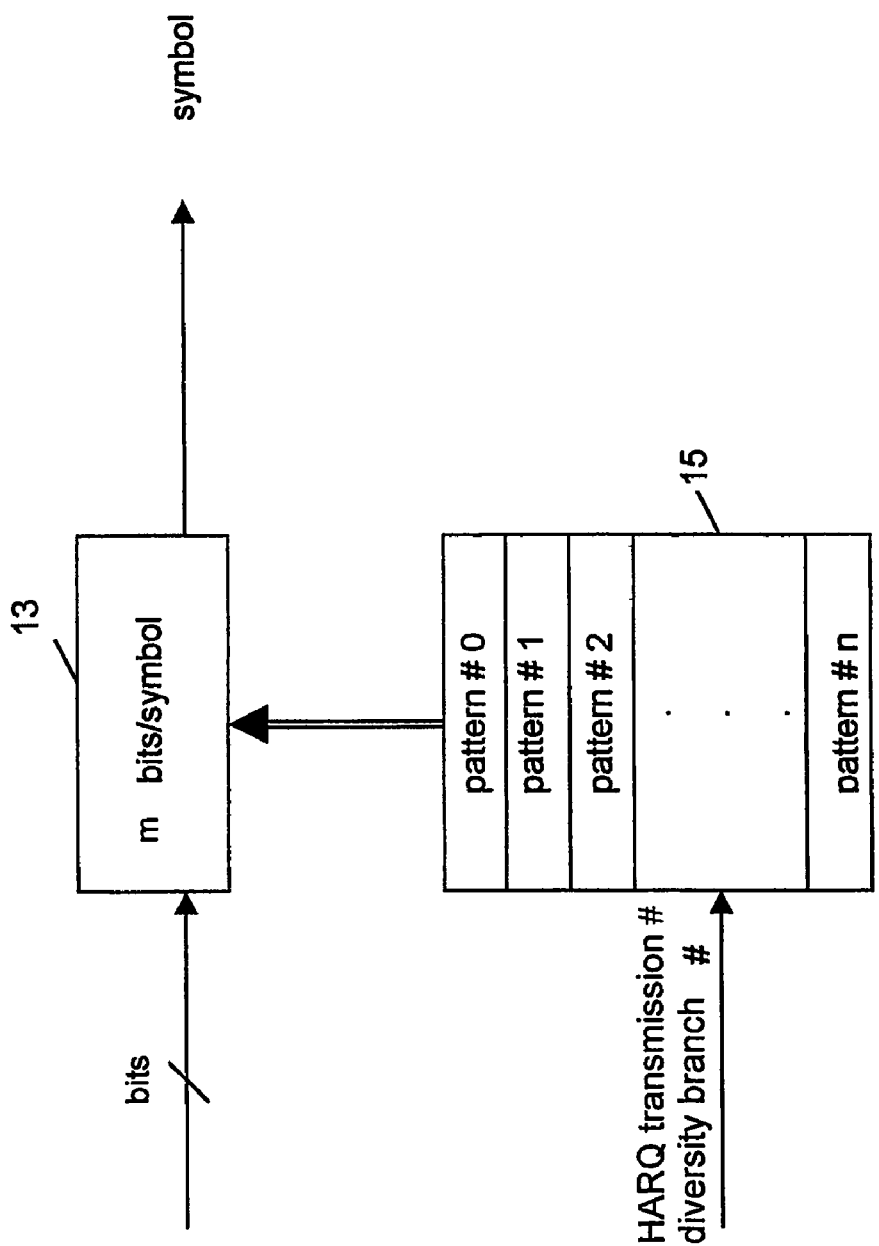
FIG. 5 details of a table for storing a plurality of signal constellation patterns.

As illustrated in FIG. 5, table 15 stores a plurality of signal constellation patterns #0 . . . #n which are selected for the individual transmissions over the individual diversity branches and HARQ transmissions according to a predetermined scheme. The scheme, i.e. the sequence of signal constellation patterns used for modulating/-demodulating are either pre-stored in the transmitter and the receiver or are signalled by transmitter to the receiver prior to usage.

The invention claimed is:

1. An ARQ re-transmission method in a wireless communication system wherein data packets are transmitted from a transmitter to a receiver using a first transmission and at least a second transmission based on a repeat request, the method comprising:
modulating data packets at the transmitter using a first modulation scheme to obtain first data symbols;
performing the first transmission by transmitting the first data symbols over a first diversity branch to the receiver;
modulating said data packets at the transmitter using a second modulation scheme to obtain second data symbols;
performing the second transmission by transmitting the second data symbols over a second diversity branch to the receiver;
demodulating the received first and second data symbols at the receiver using the first and second modulation schemes respectively; and
diversity combining the demodulated data received over the first and second diversity branches, wherein:
the modulation schemes are 16 QAM and a number of log2 (M) modulation schemes are used.

2. An ARQ re-transmission method in a wireless communication system wherein data packets are transmitted from a transmitter to a receiver using a first transmission and at least a second transmission based on a repeat request, the method comprising:
modulating data packets at the transmitter using a first modulation scheme to obtain first data symbols;
performing the first transmission by transmitting the first data symbols over a first diversity branch to the receiver;
modulating said data packets at the transmitter using a second modulation scheme to obtain second data symbols;
performing the second transmission by transmitting the second data symbols over a second diversity branch to the receiver;
demodulating the received first and second data symbols at the receiver using the first and second modulation schemes respectively; and
diversity combining the demodulated data received over the first and second diversity branches, wherein:
the modulation schemes for the first and second diversity branches are selected such that after combining the bits of the data packets the differences in magnitude among the combined bit reliabilities are reduced.

3. An ARQ re-transmission method in a wireless communication system wherein data packets are transmitted from a transmitter to a receiver using a first transmission and at least a second transmission based on a repeat request, the method comprising:
modulating data packets at the transmitter using a first modulation scheme to obtain first data symbols;
performing the first transmission by transmitting the first data symbols over a first diversity branch to the receiver;
modulating said data packets at the transmitter using a second modulation scheme to obtain second data symbols;
performing the second transmission by transmitting the second data symbols over a second diversity branch to the receiver;
demodulating the received first and second data symbols at the receiver using the first and second modulation schemes respectively; and
diversity combining the demodulated data received over the first and second diversity branches, wherein:
the data for transmission is modulated using a single redundancy version scheme with an identical data bit sequence.

4. An ARQ retransmission method in a wireless communication system wherein data packets are transmitted from a transmitter to a receiver using a first transmission and at least a second transmission based on a repeat request, the method comprising:
modulating data packets at the transmitter using a first modulation scheme to obtain first data symbols;
performing the first transmission by transmitting the first data symbols over a first diversity branch to the receiver;
modulating said data packets at the transmitter using a second modulation scheme to obtain second data symbols;
performing the second transmission by transmitting the second data symbols over a second diversity branch to the receiver;
demodulating the received first and second data symbols at the receiver using the first and second modulation schemes respectively; and
diversity combining the demodulated data received over the first and second diversity branches, wherein:
the data for transmission is modulated using a multiple redundancy version scheme of partly identical bits.

5. An ARQ retransmission method in a wireless communication system wherein data packets are transmitted from a transmitter to a receiver using a first transmission and at least a second transmission based on a repeat request, the method comprising:
modulating data packets at the transmitter using a first modulation scheme to obtain first data symbols;
performing the first transmission by transmitting the first data symbols over a first diversity branch to the receiver;
modulating said data packets at the transmitter using a second modulation scheme to obtain second data symbols;
performing the second transmission by transmitting the second data symbols over a second diversity branch to the receiver;
demodulating the received first and second data symbols at the receiver using the first and second modulation schemes resi,ectivelv; and
diversity combining the demodulated data received over the first and second diversity branches, wherein:
the properties of the first and second modulation schemes are obtained by one of:
(a) interleaving the positions of the bits mapped onto data symbols, and
(b) inverting the bit values of the bits mapped onto the data symbols.

6. The method according to claim wherein the interleaving is performed with symbols resulting in an intra symbol interleaving.

7. An ARQ re-transmission method in a wireless communication system wherein data packets are transmitted from a transmitter to a receiver using a first transmission and at least a second transmission based on a repeat request, the method comprising:

modulating data packets at the transmitter using a first modulation scheme to obtain first data symbols;

performing the first transmission by transmitting the first data symbols over a first diversity branch to the receiver;

modulating said data packets at the transmitter using a second modulation scheme to obtain second data symbols;

performing the second transmission by transmitting the second data symbols over a second diversity branch to the receiver;

demodulating the received first and second data symbols at the receiver using the first and second modulation schemes respectively; and diversity combining the demodulated data received over the first and second diversity branches, wherein:

the data is transmitted with a plurality of redundancy versions and bits of the transmitted data comprise systematic and parity bits and the systematic bits are included in each redundancy version.

8. The method according to claim 7, wherein the combined mean bit reliabilities for the systematic bits are higher than that of the parity bits.

9. An ARQ re-transmission method in a wireless communication system wherein data packets are transmitted from a transmitter to a receiver using a first transmission and at least a second transmission based on a repeat request, the method comprising:

modulating data packets at the transmitter using a first modulation scheme to obtain first data symbols;

performing the first transmission by transmitting the first data symbols over a first diversity branch to the receiver;

modulating said data packets at the transmitter using a second modulation scheme to obtain second data symbols;

performing the second transmission by transmitting the second data symbols over a second diversity branch to the receiver;

demodulating the received first and second data symbols at the receiver using the first and second modulation schemes respectively; and diversity combining the demodulated data received over the first and second diversity branches, wherein:

the first transmission comprises using the first modulation scheme and a third modulation scheme and transmitting the data modulated with the first and third modulation schemes over the first diversity branch and a third diversity branch.

10. An ARQ re-transmission method in a wireless communication system wherein data rackets are transmitted from a transmitter to a receiver using a first transmission and at least a second transmission based on a repeat request, the method comprising:

modulating data packets at the transmitter using a first modulation scheme to obtain first data symbols;

performing the first transmission by transmitting the first data symbols over a first diversity branch to the receiver;

modulating said data packets at the transmitter using a second modulation scheme to obtain second data symbols;

performing the second transmission by transmitting the second data symbols over a second diversity branch to the receiver;

demodulating the received first and second data symbols at the receiver using the first and second modulation schemes respectively; and diversity combining the demodulated data received over the first and second diversity branches, wherein:

the second transmission comprises using the second modulation scheme and a fourth modulation scheme and transmitting the data modulated with the second and fourth modulation schemes over the second diversity branch and a fourth diversity branch.

11. A transmitter for ARQ re-transmission of data in a wireless communication system wherein data packets are transmitted to a receiver using a first transmission and at least a second transmission based on a repeat request received from a receiver, the transmitter comprising:

an interleaver or inverter to obtain different modulation schemes;

a mapping unit that modulates data packets using a first modulation scheme to obtain first data symbols and modulates said data packets using a second modulation scheme to obtain second data symbols; and a transmission unit that performs the first transmission by transmitting the first data symbols using a first diversity branch and performs the second transmission by transmitting the second data symbols using a second diversity branch.

* * * * *